United States Patent [19]

Mauleon et al.

[11] Patent Number: 4,965,232
[45] Date of Patent: Oct. 23, 1990

[54] PROCESS FOR FLUIDIZED-BED CATALYST REGENERATION

[75] Inventors: Jean-Louis Mauleon, Marly le Roi; Jean-Bernard Siguad, Vaucresson; Renaud Pontier, Luzinay; Frederic Hoffmann, Paris, all of France

[73] Assignees: Compagnie de Raffinage et de Distribution Total France, Levallois-Perret; Institut Francais du Petrole, Rueil-Malmaison, both of France

[21] Appl. No.: 321,515

[22] Filed: Mar. 9, 1989

[30] Foreign Application Priority Data

Mar. 9, 1988 [FR] France ................. 88 03030
Jul. 8, 1988 [FR] France ................. 88 09441

[51] Int. Cl.⁵ ............. B01J 38/34; B01J 38/36; B01J 38/32; C10G 11/18
[52] U.S. Cl. .................. 502/43; 208/113; 208/120; 208/164; 422/144; 502/42; 502/44
[58] Field of Search ............... 502/42–44; 208/164

[56] References Cited

U.S. PATENT DOCUMENTS

| 4,417,975 | 11/1983 | Myers et al. ............... 208/164 |
| 4,427,539 | 1/1984 | Busch et al. ............... 208/113 |
| 4,595,567 | 6/1986 | Hedrick ..................... 422/146 |
| 4,789,459 | 12/1988 | Lumbroso et al. ........... 502/43 |
| 4,822,761 | 4/1989 | Walters et al. .............. 208/120 |
| 4,849,092 | 7/1989 | Ham et al. .................. 208/140 |
| 4,851,374 | 7/1989 | Yan et al. ................... 502/42 |
| 4,904,372 | 2/1990 | Goelzer ..................... 502/43 |

FOREIGN PATENT DOCUMENTS 0092065 10/1983 European Pat. Off. .
0101765 3/1984 European Pat. Off. .
0236609 9/1987 European Pat. Off. .

Primary Examiner—Paul E. Konopka
Attorney, Agent, or Firm—A. Thomas S. Safford

[57] ABSTRACT

A catalyst regeneration process effected in an apparatus which comprises two regeneration chambers, a heat exchanger, means for withdrawing from the second chamber a controlled fraction of hot catalyst for the purpose of maintaining the temperature in that chamber substantially at a first desirable value of less than 950° C., and preferably at 910° C., means for transferring this fraction of hot catalyst to the heat exchanger for the purpose of cooling it, means for the discharge of the cooled catalyst from the heat exchanger and the reinjection of the cooled catalyst into the first chamber, and means, controlled by the means for measuring the temperature in the first chamber, for regulating the supply of combustion fluid to the first chamber for the purpose of maintaining said temperature substantially at a second desired value lower than 730° C. and preferably ranging from 650° to 710° C.

13 Claims, 3 Drawing Sheets

PROCESS FOR FLUIDIZED-BED CATALYST REGENERATION

The present invention relates to a process for the regeneration of a catalyst in a fluidized bed and to an apparatus for carrying out said process. More particularly, the invention relates to the regeneration in a fluidized bed of catalysts highly loaded with hydrocarbon residues and coke as a result of a reaction with a hydrocarbon feedstock. It is applicable especially to the regeneration of hydrotreating, cracking, or reforming catalytic hydrocracking catalysts or also to the regeneration of contact masses for thermal cracking.

It is known that catalysts are routinely used in the petroleum industry, particularly in cracking processes in which hydrocarbon molecules with a high molecular weight and a high boiling point are broken down into smaller molecules suitable for the intended use and having lower boiling temperatures.

The process most widely used at present for this purpose is the so-called Fluid Catalytic Cracking (FCC) process. In this type of process, the hydrocarbon feedstock is simultaneously vaporized and contacted at high temperature with a cracking catalyst, which is kept in suspension in the feedstock vapors. After the desired range of molecular weights has been obtained by cracking, with a corresponding lowering of the boiling points, the catalyst is separated from the products obtained.

In processes of this type, the desired lowering of the boiling points is the result of controlled catalytic and thermal reactions. These reactions occur practically instantaneously when the feedstock is vaporized and contacted with the catalyst. However, the latter is rapidly deactivated during the short period of time that it is in contact with the feedstock, due to an adsorption of hydrocarbons and to the formation of a deposit of coke on the active sites. The deactivated catalyst then has to be stripped continuously with steam, for example, to recover the adsorbed or entrained hydrocarbons, and then reactivated, generally continuously, without altering its characteristics, for example, by means of a controlled combustion of the coke and of the still adsorbed hydrocarbons, in a regeneration section of one or more stages, before the regenerated catalyst is recycled to the reaction zone. Air for combustion is injected at the bottom of the regenerator, while in its upper portion cyclones are provided for separating the combustion gas from entrained catalyst particles. The catalyst so regenerated is then discharged, usually to the lower portion of the regenerator, and then recycled to the base of the elevator or riser in which the cracking reaction takes place.

The FCC process is, of course, carried out in such a way that the cracking unit is in thermal equilibrium. In other words, the intake of hot regenerated catalyst should be such that it will be able to meet the diverse heat requirements of the reaction section, that is, in particular, the preheating of the liquid feedstock,
the vaporization of that feedstock,
the heat input required by the reactions involved, which overall are endothermic, and
the heat losses of the unit.

The final temperature reached by the catalyst in the regeneration zone is determined by the quantity of coke deposited on the catalyst as well as by the mode of regeneration since the heat from the combustion serves to reheat the air for combustion and the combustion gases as well as the catalyst particles. Under operating conditions, the quantity of coke produced in the cracking unit will therefore be substantially constant if the thermal equilibrium is not modified by external stresses.

Especially in the catalytic cracking of feedstocks composed of hydrocarbons with a high boiling point (generally above 550° C.), or of feedstocks having a high Conradson carbon content and a significant concentration of metals, sizable quantities of coke and of heavy hydrocarbons may deposit on the catalyst. Their combustion during regeneration may result in considerable heat generation, which may not only exceed the metallurgical limits of the equipment but may also be a source of deactivation of the catalyst, taking into consideration its environment (moisture level, degree of contamination by heavy metals, by alkali metals, etc.)

To minimize these drawbacks, it was first proposed, according to the prior art, to reduce the excess of coke formed by limiting the regeneration temperature to a value of generally less than 750° C. by means of heat exchangers, for example, located in the regeneration chamber. The limitation of the temperature is then compensated by increasing the mass ratio of catalyst to feedstock (usually called the "C/O ratio"). However, this solution has its limits since excessively high coke production is detrimental to the upgrading of the feedstock in that it reduces the yields and also leads to oversizing of the regenerator and its adjuncts. Moreover, it increases the generation of smoke rich in $NO_x$ and $SO_x$.

It was then proposed to perform the regeneration in two zones where combustion is effected in whole or in part cocurrently with the catalyst and the oxidizing fluid see, for example, U. S. Pat. No. 4,035,284 and French patent No. 2,186,291) so as to minimize the retention time of the catalyst at a temperature that is relatively elevated but does not exceed 750° C. in order not to lower the activity of the catalyst. However, in the two cases cited above the regeneration temperature is nevertheless always limited by the fact that the combustion gases contain steam generated by the combustion of the heavy hydrocarbons contained in the coke or resulting from stripping, which must be ruled out above 730–750° C. because of the behavior at that temperature of the metallic oxides, particularly the oxides of vanadium, in the presence of sodium.

A third solution has therefore been contemplated (see U. S. Pat. No. 4,332,674 and French patent No. 2,186,291) which consists in burning only a portion of the coke and of the hydrocarbons deposited on the catalyst, at a moderate temperature, during a first regeneration stage in a chamber having its own discharge means for the gaseous effluents, so as to maintain the catalyst below a maximum of about 700° C. with a view to preventing the active sites of the catalyst from being damaged by the steam from either the stripping stage or the combustion of the hydrocarbons still present in the coke on the catalyst. This limitation of the temperature during a first regeneration stage is usually accomplished by limiting the quantity of air for combustion to less than the stoichiometric quantity, which results in a judicious combustion of the carbon to CO, and preferably to $CO_2$. Thereafter, during a second stage in a second regeneration chamber distinct from the preceding one, the complete combustion of the carbon still on the catalyst need not be limited temperaturewise in view of the prior elimination of the steam. In this second stage, the temperature may therefore be allowed to rise up to the thermal equilibrium (up to a possible 950° C.), owing to a stoichiometric excess of oxygen which favors combustion to $CO_2$, provided, however, that the metallurgical stresses of the installation are effectively controlled, by locating the cyclones and the catalyst overflow chambers outside of the combustion zone so as to protect the metallic portions therefrom by means of internal refractories.

For the high-temperature regeneration of a catalyst with a heavy coke buildup it is therefore preferable to effect combustion in two distinct zones provided with their own means for separating the effluent gases, which means that the catalyst regenerated at high temperature will not be in contact with the steam generated during the first regeneration stage. Thus, from 30 to 70 percent of the coke deposited can be burned off in the course of the first regeneration stage at an average temperature of less than 700° C., and preferably less than 650° C., and from 30 to 70 percent of the carbon still on the catalyst is burned off in the fluidized bed or entrained from the second regenerator without limitation of the temperature.

However, this solution, which consists in operating the second regenerator at a regeneration temperature ranging from 750° to 950° C., depending on the object to be accomplished, or depending on the type of feedstock being processed, still has its drawbacks: There are, in fact, cases where an excessively high regeneration temperature can result in substandard performance because of too rapid deactivation of certain catalysts, or can also result in a lower circulation rate of hot catalyst than is theoretically desired for optimal conversion.

It would thus be desirable to limit the temperature of each of the regenerators by means of several heat exchangers, but this would entail substantial extra costs and difficulties in controlling the temperature of each of the chambers.

The present invention seeks to propose a simple solution that makes it possible to optimize the temperature in the two regeneration chambers and to adapt the final temperature of the regenerated generated catalyst specifically to the requirements of the feedstock to be processed in the conversion unit.

The present invention thus has as a first embodiment a process for the continuous regeneration of a catalyst by combustion in a fluidized bed of the coke deposited on the catalyst in the course of a hydrocarbon conversion reaction, said process being of the type in which a proportion of about 50 to 90 percent of the coke is burned in a first stage, at a temperature $T_1$ which does not exceed about 730° C. and preferably ranges from 650° to 710° C., in a first regeneration chamber operated with a fluidized bed, where the catalyst particles to be regenerated are introduced essentially countercurrently to an oxygen-containing fluid, said chamber having its own means for discharging the gaseous effluents containing the steam entrained or generated during such combustion, while the 10 to 50 percent of residual coke is burned during a second regeneration stage, in the presence of a fluid containing an excess of oxygen in relation to the stoichiometry of the combustion, at a temperature $T_2$ greater than $T_1$ and less than 950° C., and preferably at 910° C., in a second regeneration chamber distinct from the first one, said process being characterized in that the temperature $T_2$ of the regenerated catalyst particles coming from the second regeneration chamber and recycled to the conversion-reaction zone is maintained at a value predetermined on the basis of the requirements of the reaction zone by withdrawing a controlled quantity of catalyst from the second chamber and cooling it to a temperature level $T_3$ lower than $T_1$, the fraction of catalyst so cooled being essentially reintroduced into the fluidized bed of the first regeneration chamber, whose temperature of combustion is maintained at substantially the value of $T_1$ through appropriate adjustment of the quantity of oxygen-containing fluid introduced into that chamber.

The process in accordance with the invention thus permits, by increasing the feed rate of oxygen to the first chamber, to increase the combustion of coke, which then generates more heat and compensates for the cooling resulting from the inflow of catalyst that has been cooled in the heat exchanger, which makes it possible to maintain the temperature $T_1$ at an optimum value close to 710° C. and to send a catalyst containing less coke to the second regeneration chamber. It thus becomes possible to lower the final temperature $T_2$ resulting from the complete combustion of the coke in the presence of an excess of oxygen.

By excess of oxygen in the second regeneration chamber is meant a proportion of oxygen greater than the stoichiometry of the reaction permitting the carbon to be converted essentially to carbon dioxide.

The combination of these stages of the process offers several advantages over the solutions proposed in the prior art.

In the first place, the regenerated catalyst is adjusted to a temperature that meets the requirements of the unit more closely, especially with respect to the vaporization of the injected feedstock as well as the C/O (catalyst-to-feedstock) ratio, which can be optimized. That temperature is therefore tied to a lesser degree than in the prior art to the difference between the quantities of coke present on the catalyst at the inlet and outlet of the regeneration zone (this difference being known as "delta coke"); it is now fixed solely to meet the heat requirements of the unit. The process of the invention thus makes it possible to choose an optimum mass ratio between catalyst and feedstock. This choice aids in obtaining a high octane rating and in increasing the conversion of the feedstock. Moreover, because the deactivated catalyst from the first regeneration chamber is diluted with at least partially regenerated catalyst from the second chamber, the combustion kinetics is such that fewer hot spots are observed. The more homogeneous temperature resulting therefrom makes it possible to approach the catalyst-stability limiting temperature (about 710° to 750° C., depending on the retention time and the temperature of the catalyst) more efficiently in the presence of steam, which helps to further increase (up to 90 percent and higher) the rate of combustion of the coke in the first regeneration chamber without exceeding a predetermined temperature $T_1$.

Moreover, by limiting the retention time at high temperature of the catalyst particles in the second regeneration zone to the strict minimum (until there is little coke left to burn) through a reduction of the size of the regenerator and/or of its inventory, the likelihood of catalyst deactivation is also reduced.

Furthermore, since the catalyst is deactivated to a lesser degree than in units of the conventional type, the makeup catalyst, which generally ranges from 0.5 to 10 kg of catalyst per ton of feedstock injected (a quantity that varies essentially with the metal content of the feedstock and with the final temperature of the regenerated catalyst), can now be reduced by a considerable percentage (of the order of from 25 to 50 percent), which translates into a direct savings in the operating costs of the cracking unit involved and into easier maintenance of the catalytic activity at the desired level.

With the makeup catalyst considerably reduced, the mass of catalyst which circulates in the unit is much more homogeneous from the point of view of catalytic activity, which translates into better selectivity, and hence improved yields of wanted products (gasolines or gas oils, as the case may be), and consequently a higher value of the effluents of the cracking unit.

Finally, the reduction of the size of the equipment of the second regeneration zone (catalyst inlet means, means for injection of the combustion gases, and regenerated-catalyst separator) resulting from the fact that the major portion of the coke has been removed during the first stage makes possible a significant reduction of the construction costs of the cracking unit.

Stated in greater detail, the process of the invention may be carried out as follows:

(a) The catalyst to be regenerated and the oxygen-containing fluid are introduced into the first regeneration chamber, the fluid flowing upward countercurrently to the catalyst;

(b) the gaseous effluents are separated in the upper portion of the first regeneration chamber and the partially regenerated catalyst is withdrawn at the bottom of the chamber, to be sent to the second regeneration chamber, where the second regeneration stage is operated at a higher temperature;

(c) a portion of the catalyst coming from the second chamber is passed to a heat exchanger in order to cool the catalyst as well as to recover heat; and (d) the catalyst so cooled is drawn off and recycled into the fluidized bed of the first regeneration chamber.

The catalyst coming from the second regeneration chamber may flow downward, by gravity, in the heat exchanger.

It may also flow upward therein in a preferably dense fluidized bed, the cooled catalyst then overflowing from the exchanger to enter the first regeneration chamber in proximity to the dense fluidized bed of the first chamber.

Since in the latter embodiment the catalyst circulates upward in the heat exchanger (cooling zone), the likelihood of its encountering blind zones in the exchanger is minimized. The upward flow of the catalyst avoids the stagnation zones where the exchange would be reduced, and the flow is therefore better. Moreover, the discharge of the catalyst, which occurs by overflowing, results in a substantially constant level in the exchange, the exchange surfaces being constant.

In accordance with another characteristic of this embodiment of the process of the invention, the rate of circulation of the hot regenerated catalyst in the exchanger can be adjusted by introducing a gaseous fluidizing fluid at the bottom of the exchanger through a fluidizing ring. This fluid, preferably air, is introduced at a rate which usually ranges from 0.1 to 1 meter/second, and preferably from 0.3 to 0.5 meter/second. At these preferred values, a better heat-transfer coefficient has been observed.

According to another characteristic of this embodiment, the hot catalyst is caused to flow generally downward, before its introduction into the exchanger, from the second regeneration zone to the heat exchanger, through a substantially elongate tubular conduit, and then through a bent and preferably semicircular zone situated upstream of the heat exchanger. The density of the catalyst is generally maintained substantially at a value corresponding to bubble-free fluidization in that conduit by means of at least one injection of a first injection fluid. As a rule, from 0.05 to 0.4 kg/sec/m$^2$ of tubular section, and advantageously from 0.1 to 0.2 kg/sec/m$^2$ of section, of a first aerating fluid, which may be air and advantageously is steam, is injected. Each level of injection may be spaced 0.5 to 2 meters, and preferably 0.6 to 1 meter, from the next. However, since this density of the catalyst is greater than that of the catalyst in the exchanger, the introduction of the latter into the exchanger poses no difficulties.

In accordance with a further characteristic of the process of the invention, the feed rate of catalyst into the heat exchanger may be regulated by means of a control valve inserted in the tubular conduit upstream of the heat exchanger.

In the embodiment where the catalyst flows upward in the exchanger, this control valve may be dispensed with and a second aerating fluid may be injected at least once into the bent zone, preferably into its lowermost portion, at a rate which generally ranges from 0.01 to 0.05 kg of air/sec/m$^2$ of section, and preferably from 0.02 to 0.03 kg of air/sec/m$^2$.

In that embodiment, the catalyst overflowing from the heat exchanger may be discharged through the upper end of the heat exchanger or through a lateral outlet pipe located in the upper portion of the exchanger, preferably above the internal exchange surfaces, of which maximum use is thus made.

The quantity of catalyst cooled by means of the exchanger is generally less than 150 percent by weight of the catalyst in circulation in the first regeneration zone. It has been observed that an excellent rate of regeneration is obtained with a quantity of cooled catalyst of between about 15 and 50 percent by weight.

The temperature of the catalyst coming from the second regeneration chamber will generally be reduced from a temperature of about 710° to 900° C. to a temperature ranging from 400° to 700° C., and preferably from 450° to 600° C.

Consequently, the increase in the flow rate of the oxidizing fluid to compensate for the cooling due to the inflow of cooled catalyst into the first regeneration chamber may be from 1 to 50 percent of the flow rate normally required without the use of the heat exchanger.

Under these conditions of combustion in accordance with the present invention, the $CO/CO_2$ ratio in the first regeneration chamber usually ranges from 0.3 to 1.5, and preferably from 0.5 to 1.3.

In accordance with a particularly advantageous embodiment of the present invention, the catalyst from the second regenerator is cooled by means of a tubular heat exchanger of a type known per se in which a cooling fluid, for example, air, water, steam, or mixtures of these fluids, is circulated and this fluid is extracted from the exchanger at a temperature which generally ranges from 300° to 750° C., which is particularly advantageous at this temperature level. In particular, this high-temperature steam can be reused to improve the stripping conditions of the catalyst coming from the reaction and thus to permit better recovery of the hydrocarbons.

As pointed out above, the temperature $T_2$ of the second regeneration chamber can be regulated by varying the flow rate of the catalyst particles circulating in the heat exchanger, for example, by means of a slide-gate valve, to adapt the temperature of the regenerated catalyst to the mass ratio of catalyst to hydrocarbons to be cracked, which permits the conversion reaction of these hydrocarbons to be optimized.

In addition to the rate of circulation of the catalyst in the heat exchanger, the flow rate of the oxidizing fluid of the first regeneration chamber can also be regulated, by the use of a temperature sensor, which makes it possible to determine the spread between the temperature measured and the desired value, and consequently to act on the oxidizing-fluid inlet means.

The catalysts susceptible of being regenerated by the process of the invention are generally those described in the prior art (for example, in U. S. Pat. No. 4,405,445). These catalysts generally have, at equilibrium, a percentage of hydrocarbon residues and coke of over 1.3 weight percent and a heavy-metal content of between about 5,000 and 60,000 ppm.

In accordance with a particularly advantageous embodiment of the invention, CO combustion inhibitors or coke combustion accelerators, including, for example, alkaline-earth compounds such as those described in European patent Nos. 107,375, 120,096 and 32,277, may be introduced (by conventional catalyst-impregnation techniques).

These may be used at a concentration of from 0.001 to 5 weight percent, and preferably from 0.1 to 2 weight percent, based on the weight of the catalyst particles.

The invention has as a further eembodiment an apparatus for the continuous regeneration of a deactivated catalyst by combustion in a fluidized bed of the coke deposited on the catalyst in the course of a hydrocarbon conversion reaction, said apparatus comprising, on the one hand, a first chamber for regeneration of the catalyst by combustion of the coke deposited thereon, said first chamber being equipped with a supply pipe for the deactivated catalyst, inlet means for an oxygen-containing fluid, and means for the discharge of the effluents, and on the other hand a second regeneration chamber provided with a pipe for the supplying of partially regenerated catalyst from the first chamber, second inlet means for a combustion fluid, and means for the separation of the regenerated catalyst from the combustion gases, each of the chambers comprising, moreover, a means for measuring the temperature of combustion in the fluidized bed, said apparatus being characterized in that it comprises a heat exchanger; means for withdrawing from the second chamber a controlled fraction of hot catalyst for the purpose of maintaining the combustion temperature in that chamber substantially at a first desired value of less than 950° C., and preferably at 910° C.; means for transferring that fraction of hot catalyst to the heat exchanger for the purpose of cooling it; means for the discharge of the cooled catalyst from the heat exchanger and the reinjection of the cooled catalyst into the first chamber; and means, controlled by the means for measuring the temperature in the first chamber, for regulating the supply of combustion fluid to the first chamber for the purpose of maintaining said temperature substantially at a second desired value lower than 730° C. and preferably ranging from 650° to 710° C.

The means for transferring the hot catalyst coming from the second regeneration chamber may supply the upper portion of the heat exchanger so that the catalyst flows downward by gravity therein, to be discharged, after being cooled in its lower portion, toward the first regeneration chamber.

The transfer means may also abut on an inlet of the lower portion of the heat exchanger so that the catalyst flows upward in a fluidized bed in the exchanger.

In all cases, the heat exchanger is advantageously equipped with a means for the diffusion of a fluid capable of maintaining the catalyst in a fluidized state therein.

The heat exchanger may be of a type known per se. It may comprise an upright shell in which the catalyst circulates outside of the tubes, with the cooling fluid circulating inside the tubes. In accordance with another embodiment, the hot regenerated catalyst circulates inside the tubes and the cooling fluid on the outside.

The heat exchanger may be of another type: The wall forming the shell of the exchanger may be part of the exchange surface. This surface is in the form of tube sheets, that is, a plurality of tubes in which the cooling fluid circulates and which are disposed concentrically and extend parallel to the longitudinal axis of the exchanger are joined by fins welded lengthwise to form a continuous pressure-tight outer surface. Since the exchange surface generally is not sufficient to provide all of the required heat exchange, the interior of the exchanger may be filled with a plurality of exchange tubes, advantageously arranged in at least one substantially concentric circle but preferably uniformly distributed. Moreover, additional internal surfaces may be immersed in the fluidized bed. These surfaces may be formed of tube sheets, bundles of tubes of diverse shapes (U tubes, hairpin tubes, or bayonet tubes), or coils. Internal headers provide for the distribution of water and the collection of the steam.

This tube-sheet heat-exchanger configuration offers the following advantages:

An increase in exchange surface for a given exchanger volume, or a reduction of the internal exchange surfaces for a constant total surface. Fluidization of the catalyst in the interior of the exchanger is promoted thereby, and the risk of dead areas or of agglomerations is eliminated, which improves the exchange.

Elimination of the need for an internal refractory due to the fact that the temperature of the tube sheet, which is very close to the temperature of the fluid circulating within the tubes, remains sufficiently low so that protection is not required.

The heat exchanger may be external to the regeneration units. It may also be located in the interior of the first regeneration chamber, as will be explained further on in greater detail, and in that case it advantageously comprises a partition delimiting a heat-exchange compartment of such height that it disperses the upper level of the dense fluidized bed in the regeneration chamber. The heat exchanger is advantageously equipped with a means for the diffusion of a fluid intended to maintain the catalyst in the fluidized state therein.

Control of the quantity of hot catalyst withdrawn from the second regeneration chamber is provided, for example, through a valve which is located downstream or upstream of the heat exchanger and is under the control of a means for measuring the temperature in that chamber, with this valve opening when the temperature measured is higher than the desired temperature.

Various embodiments of the invention are described below in detail, by way of example but not of limitation, with reference to the accompanying drawings, wherein.

In the apparatuses illustrated, the catalyst is regenerated in a fluidized-bed regeneration system in which the second regeneration chamber is located above the first chamber. However, this embodiment has no limitative character.

Figure 1:
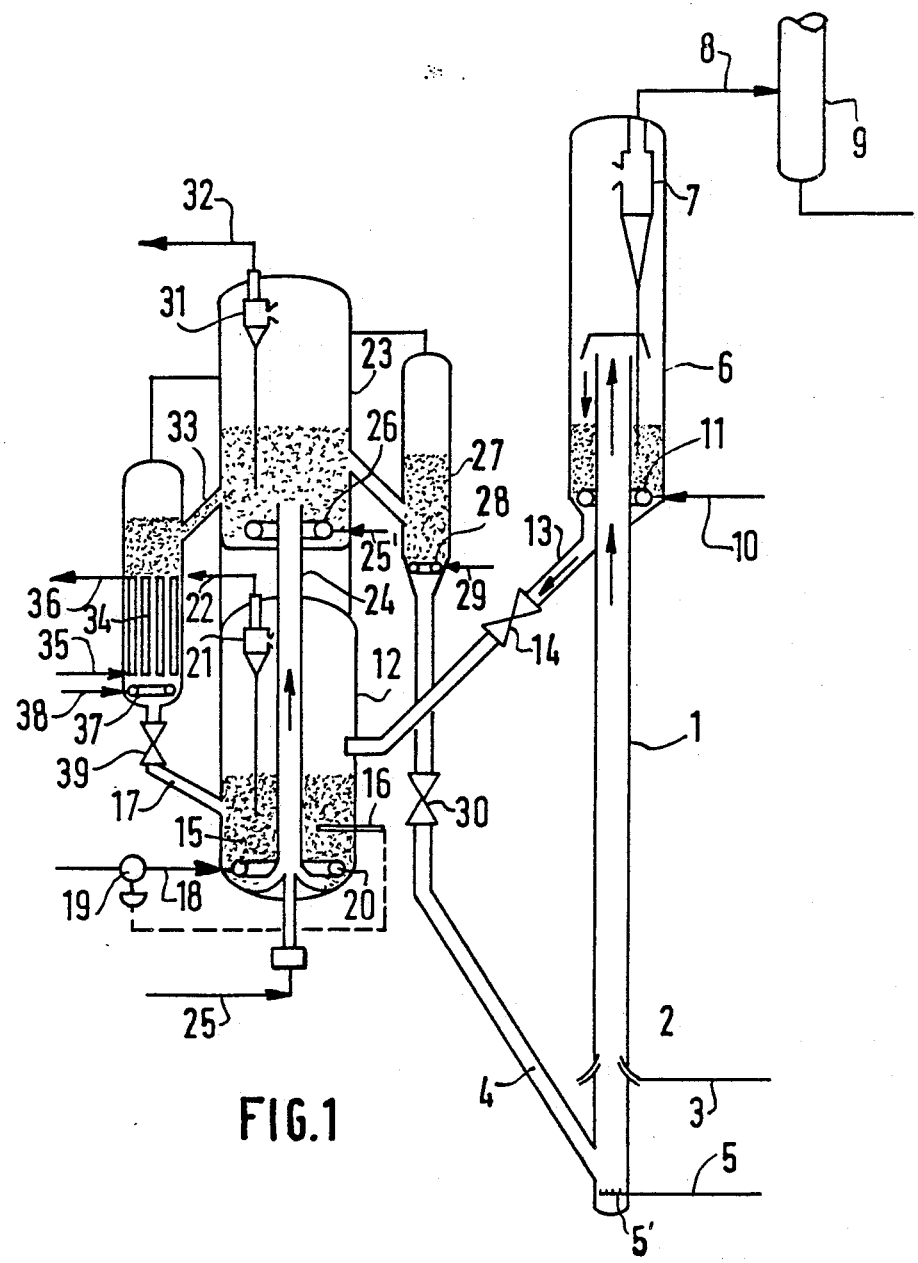
FIG. 1 is a diagram of a fluidized-bed catalytic cracking installation equipped with a regeneration apparatus in accordance with the invention, in the heat exchanger of which the catalyst circulation is downward.

The apparatus shown in FIG. 1 essentially comprises a column 1, known as feedstock elevator or riser, which is supplied at its base with feedstock to be processed, through injectors 2 connected to a supply line 3;

regenerated catalyst, through the pipe 4; and fluidizing gas, through the diffuser 5', fed by the line 5.

The column 1 empties at its top into a vessel 6 which is concentric therewith and in which the cracked feedstock is separated and the deactivated catalyst is stripped. The reaction products are separated in a cyclone 7, at the top of which a line 8 for the discharge of the cracked feedstock to the fractionating unit 9 is provided while the deactivated catalyst particles are stripped at the bottom of the vessel 6. To this end, a line 10 supplies diffusers 11, disposed regularly at the bottom of the vessel 6, with stripping gas, usually steam.

The deactivated catalyst particles so stripped are discharged to a first regeneration chamber 12 through a pipe 13 in which a control valve 14 is provided. This pipe here terminates in an overflow permitting a homogeneous dispersion of the catalyst particles, preferably in the dilute portion overlying the dense fluidized bed 15 in the first chamber 12. The temperature of the fluidized bed is measured by means of a sensor 16. When that temperature falls below a desired value $T_1$ as a result of the introduction of relatively cold catalyst introduced through the line 17, as will be shown further on, the rate at which oxidizing fluid is fed to the diffuser 20, located at the bottom of the chamber, through the line 18 provided with a control valve 19, is increased until the temperature measured at 16 again coincides with the desired value.

Approximately 50 to 90 percent of the coke (and substantially all of the residual hydrocarbon compounds) are thus burned countercurrently to the air which is injected at the bottom of the regenerator. The combustion gas rich in CO and $H_2O$ is discharged through a line 22 after it has been freed of catalyst fines in the cyclone 21.

The partially regenerated catalyst particles are then transferred to a second regeneration chamber 23, located above the chamber 12, through the pipe 24, supplied with air through the line 25. A diffuser 26 supplied with air through the line 25 may be located at the bottom of the second regeneration chamber.

A portion of the regenerated catalyst particles is discharged sideways into a buffer vessel 27. In that vessel, the fluidization of the particles is routinely controlled by means of an annular diffuser 28, which is supplied with a fluidizing gas, such as air or an inert gas, through a line 29. From the vessel 27, the regenerated catalyst particles are recycled through the pipe 4 to the intake of the riser 1, in a quantity determined by whether a valve 30 is open or closed. In the upper portion of the chamber 23, the combustion gases are separated from the catalyst particles by means of a cyclone 31 and are discharged through a line 32.

Another portion of the catalyst overflows through the pipe 33 into a heat exchanger 34, of a type known per se, which comprises an inlet line 35 for the cooling fluid (generally air, water or steam, individually or as a mixture) and an outlet line 36 for the reheated fluid. At its bottom, the exchanger 34 is provided with a diffuser 37 supplied through a line 38 with a fluidizing gas, such as air, intended to improve the heat exchange by maintaining good fluidization of the catalyst particles in the exchanger. At the outlet of the exchanger 34, a valve 39, such as a slide-gate valve, makes it possible to control the rate at which catalyst is transferred from one chamber to the other when the temperature of the regenerated catalyst exceeds the desired value.

The rate at which the catalyst flows through the heat exchanger is adjusted to maintain the temperature prevailing in the first regeneration chamber and thus, ultimately, the inlet temperature into the reaction zone 1, at a desired temperature appropriate to the feedstock cracked in the unit. When the temperature of the regenerated catalyst is higher than this desired value, the quantity of catalyst passing through the heat exchanger is increased. The cooling of the catalyst in the fluidized bed of the first regeneration chamber is then compensated by an increase in the oxygen feed rate, and a larger quantity of coke can then be burned. Conversely, when the temperature of the regenerated catalyst falls below the desired value necessary for the catalytic reaction to proceed properly, the flow of recycled catalyst to the heat exchanger is reduced and possibly stopped, which permits the temperature of the regenerated catalyst to rise again.

In the embodiment of FIG. 2, there is again a column 101, known as a feedstock elevator or riser, whose base is supplied with feedstock to be processed through the line 102, with particles of a cracking catalyst, for example, a zeolite, through the line 103, and with a fluidizing gas through the line 103'.

The column 101 empties at its top into a vessel 104 which is concentric therewith and in which the cracked feedstock is separated and the spent catalyst is stripped. The processed feedstock is separated in a cyclone 105 which is accommodated in the vessel 104 and at the top of which a line 106 for the discharge of the cracked feedstock is provided while the stripped particles of spent catalyst are discharged at the bottom of the vessel 104. A line 107 supplies fluidizing means or injectors 108, disposed regularly at the bottom of the vessel 104, with stripping gas, usually steam.

The spent catalyst particles so stripped are discharged at the bottom of the vessel 104 to a first regeneration unit 109a through a pipe 110 in which a control valve 111 is provided. This pipe terminates in an overflow permitting a homogeneous dispersion of the catalyst particles in the dilute portion, situated above the dense bed 125 of the first regenerator 109a. These spent and stripped catalyst particles are diluted and cooled in the lower portion of the first regeneration unit by means of a partial input of regenerated catalyst particles which have been cooled by a cooling means or heat exchanger 132, described further on, which come from the second regeneration unit 109b, located above the first one. A pipe 126a is provided for the movement of the catalyst from the second unit to a disengagement chamber 127 at the bottom of which a fluidizing ring 130 supplies air intended to impart to it an appropriate density before it flows downward in a vertical tubular transfer column 128. All along this column 128, injection means 129 are disposed for an aerating fluid, for example, steam, these being distributed evenly and intended to maintain the density of the catalyst within a well-defined range, for example, between 500 and 800 kg/m$^3$, corresponding to bubble-free fluidization.

At the lower end of the column, and thus upstream of the exchanger, a valve 131 provides control of the flow rate of the hot regenerated catalyst supplied to the lower end 133 of the heat exchanger 132. This valve may advantageously be replaced by at least one injection means 141 for an aerating fluid capable of regulating the flow rate of the catalyst in the exchanger. This injection means is generally located in the bent intermediate zone 140, preferably at its lowermost point.

The hot catalyst rises through the heat exchanger in a preferably dense fluidized bed with the aid of a fluidizing ring 134 supplied with air which aerates it and distributes it through the exchanger. The exchange plates or tubes 135a which make up the exchanger are fully immersed in the fluidized bed, and the catalyst level in the exchanger 132 is established by the position of the discharge pipe 136. The latter is located in the upper side portion of the exchanger and in the immediate vicinity of the regenerator 109a. The cooled catalyst is then discharged by overflowing into the first regenerator 109a and moves downward by gravity, advantageously in a dilute fluidized bed appreciably above the dense fluidized bed 125 of the first regenerator 109a.

Above the level of the dense fluidized bed in the exchanger there is disposed a disengagement zone where the separation of the catalyst particles from at least a portion of the fluidizing or aerating air takes place. This air is usually discharged, through a pipe which is not shown, in the upper portion 137 of the exchanger and, since it is hot, may optionally be recycled to any level of the regenerators.

In the first regeneration unit, preferably from 50 to 90 percent of the coke and substantially all of the residual hydrocarbon compounds are burned in a fluidized bed, preferably counter-currently to the air which is injected at the bottom of the regenerator through a line 112 that supplies injectors 113. The catalyst particles are entrained by the combustion gases and separated by means of internal cyclones 114, advantageously located in the upper portion of the first regeneration unit. The combustion gas rich in hydrogen sulfide, carbon monoxide and water is discharged under pressure through a line 115 for further treatment while the catalyst particles are passed to the bottom of the first regenerator 109a. They are then transferred to the second regeneration unit 109b, located above the first regeneration unit, through the pipe 116, supplied with air through the line 117.

The bottom of the second regeneration unit is also supplied with air, through the line 118 and through injectors 119. The combustion of the remaining coke is effected cocurrently with the injected air.

A portion of the regenerated catalyst particles is discharged sideways into a buffer vessel 120. The particles whose flow rate is usually controlled by means of an annular diffuser 120a that is supplied with a gas (an inert gas or oxygen) are recycled through the pipe 103 to the intake of the riser 101 with the aid of a fluidizing gas injected through the line 103'. This pipe is kept aerated.

The combustion gases discharged in the upper portion of the stage 109b are treated in an internal or external cyclone 121, at the bottom of which the catalyst particles are returned through the pipe 122 to the second stage 109b while the combustion gases are discharged through the line 123, which is provided with a safety valve 124.

The other portion of the catalyst is conveyed through the pipe 126 to the parallel-connected heat exchanger 132. The latter consists of tube sheets 135 forming the impervious outer shell. These tubes extend substantially parallel to the longitudinal axis of the exchanger and are joined by means of fins welded lengthwise to form an outer shell.

The exchanger comprises in its interior a plurality of tubes 135a, disposed concentrically and distributed uniformly about the longitudinal axis of the exchanger. A water inlet pipe 138 supplies these internal and external tubes at the bottom of the exchanger, and an outlet line 139 in its upper portion discharges the reheated fluid.

Figure 2:
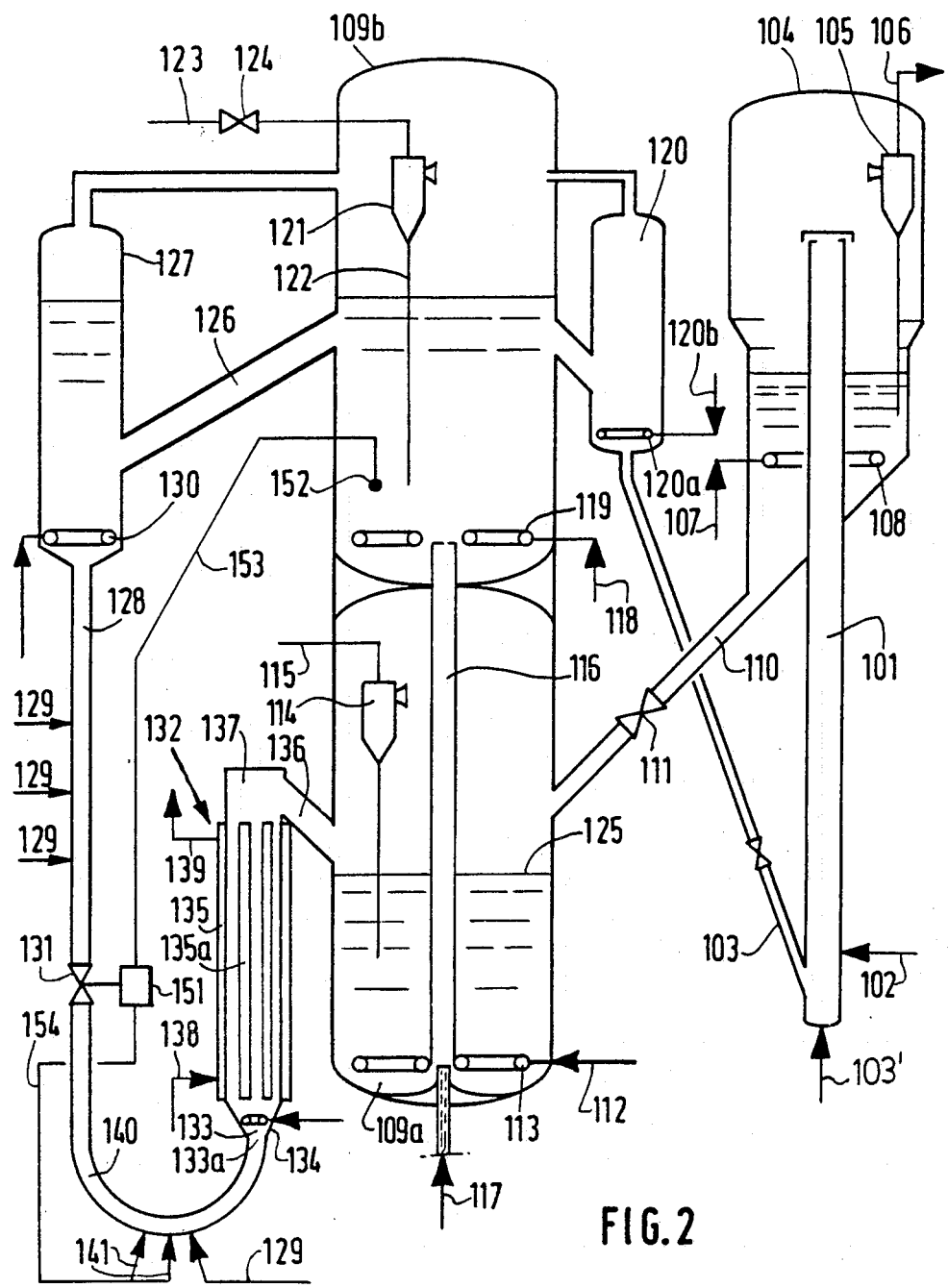
FIG. 2 illustrates another installation of this type, in which the catalyst circulates upward in the heat exchanger.

In accordance with another embodiment of the process, not shown in FIG. 2, the lower end 133 of the exchanger 132 may be connected, through the bent portion 140 comprising the means for injection of a second aerating fluid capable of controlling the flow rate of the catalyst in the exchanger, to the line 103 recycling the catalyst to the intake of the riser 101.

Figure 3:
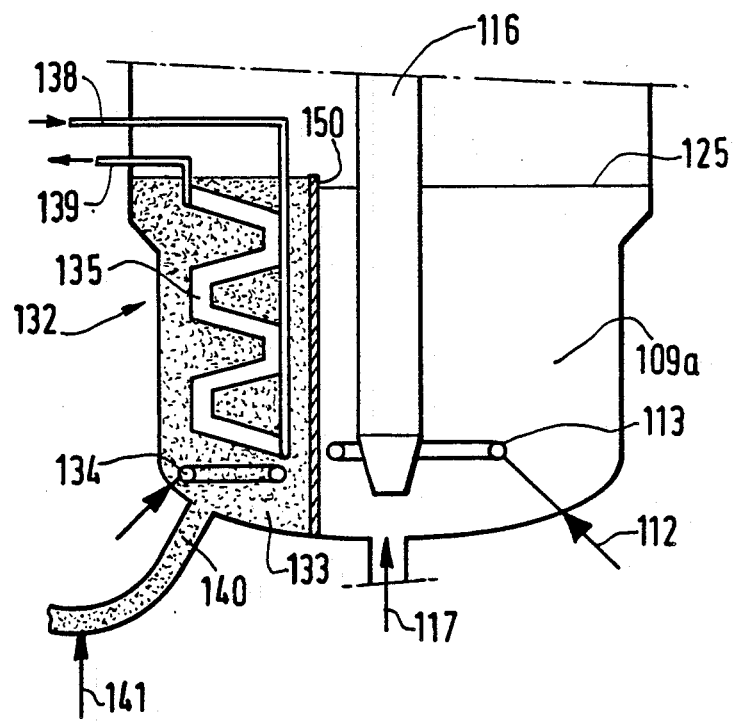
FIG. 3 is a fragmentary view on a larger scale of a variation where the heat exchanger of the regeneration apparatus is located in the interior of the first regeneration chamber.

According to another embodiment of the process, illustrated in FIG. 3, the exchanger 132 need not be external. In fact, it may be set into the first regenerator 109a. A flat or circular partition 150, which may optionally serve as a heat-exchange plate, imperviously delimits, together with a portion of the regenerator wall, a heat-exchange compartment in the regeneration zone. The dimension of this plate which defines the height of the exchanger is such that it extends above the surface of the dense fluidized bed.

The hot regenerated catalyst reaches the bottom of the exchanger through the bent portion 140. Air injection means 141 control the flow rate of the catalyst entering the exchanger. The catalyst is fluidized by means of the fluidizing ring 134 at the lower end 133 of the exchanger and circulates upward in the exchanger as it is being cooled by contact with the plates 135, supplied with water through the line 138. The reheated fluid is discharged through the line 139. The catalyst then overflows the top of the partition 150 and drops to a level above the dense regeneration bed 125.

In the case of FIGS. 2 and 3, the rate at which the catalyst flows through the heat exchanger is adjusted by acting on the flow-control means(either the valve 131 or the injection means 141) to maintain the temperature in the second regenerator at a satisfactory level, and consequently the temperature of the regenerated catalyst recycled to the intake of the riser at a desirable temperature which is dependent on the feedstock to be cracked.

These catalyst flow control means (131, 141) are usually brought under the control of measuring means 152 for the temperature of the dense bed in the second regenerator 109b, through control means 151, by the use of connecting lines 153 or 154.

When the temperature of the catalyst in the second regeneration unit exceeds the desired temperature, a larger portion of of the catalyst coming from the second regenerator is diverted to the exchanger by adjusting the flow rate of the catalyst as indicated above. The temperature of the first regeneration unit is then lowered and a larger quantity of coke can be burned there.

This specification is based upon two French priority documents, France-No. 8803030 and France- No. 8809441, filed Mar. 9, 1988, and July 8, 1988, respectively, which are incorporated herein by reference.

We claim:

1. A process for the continuous regeneration of catalyst particles by combustion in a fluidized bed of the coke deposited on the catalyst particles in the course of a hydrocarbon-conversion reaction, comprising burning in a first regeneration stage a proportion of about 50 to 90 percent of the coke remaining on stripped catalyst particles received from a hydrocarbon-conversion zone, at a temperature $T_1$ which does not exceed about 730° C., in a first regeneration zone operated with a dense fluidized bed; the catalyst particles to be regenerated being introduced to said first zone essentially countercurrently to an oxygen-containing fluid; said first regeneration zone having its own discharge outlet for gaseous effluents containing steam entrained or generated during such combustion, and a $CO/CO_2$ ratio ranging from 0.3 to 1.5; burning the 10 to 50 percent of residual coke from the catalyst particles in a second regeneration stage, in the presence of a fluid containing an excess of oxygen in relation to the stoichiometry of the combustion, at a temperature $T_2$ greater than $T_1$ and less than 950° C., in a second regeneration zone distinct from the first one; maintaining the temperature $T_2$ of the regenerated catalyst particles coming from the second regeneration zone and recycled to the conversion-reaction zone at a value predetermined on the basis of the requirements of the conversion-reaction zone by withdrawing a controlled quantity of catalyst from the second zone and cooling it to a temperature level $T_3$ lower than $T_1$; reintroducing the fraction of catalyst so cooled into the fluidized bed of the first regeneration zone; increasing the flow rate of the oxidizing fluid supplying the first regeneration zone between 1 and 50 percent of the normal flow rate of that fluid in the absence of the introduction of the cooled catalyst; and maintaining the temperature of combustion in the first regeneration zone at substantially the value of $T_1$ through appropriate adjustment of the quantity of oxygen-containing fluid introduced into that chamber.

2. A process as defined in claim 1, wherein the quantity of catalyst withdrawn from the second regeneration zone and cooled is less than 150 percent by weight of the mass of catalyst in circulation in the first regeneration zone.

3. A process as defined in claim 1, wherein the temperature of the cooled catalyst reintroduced into the first regeneration zone ranges from 400° to 700° C.

4. A process as defined in claim 1, wherein (a) the catalyst to be regenerated and the oxygen-containing fluid are introduced into the first regeneration zone, and the fluid flows upward, countercurrently to the catalyst;

(b) the gaseous effluents are separated in an upper portion of the first regeneration zone and the partially regenerated catalyst is withdrawn at the bottom of the zone, and is sent to the second regeneration zone, where the second regeneration stage is operated at a higher temperature;

(c) a portion of the catalyst coming from the second zone is passed to a heat exchanger in order to cool the catalyst as well as to recover heat; and (d) the catalyst so cooled is drawn off and recycled into the fluidized bed of the first regeneration zone.

5. A process as defined in claim 4, wherein a fluid is employed in the heat exchanger to cool the catalyst and is also used to strip the deactivated catalyst prior to its regeneration.

6. A process as defined in claim 1, wherein the regenerated catalyst coming from the second regeneration zone flows downward by gravity in a heat exchanger.

7. A process as defined in claim 1, wherein the regenerated catalyst coming from the second regeneration zone flows upwardly in a heat exchanger.

8. A process as defined in claim 1, wherein the regenerated catalyst coming from the second regeneration zone is fluidized in a heat exchanger by injection into the exchanger of a gaseous fluid at a rate of from 0.1 to 1 meter/second.

9. A process as defined in claim 8, wherein the regenerated catalyst is introduced at the bottom of the heat exchanger through a transfer means comprising a bent zone in which the isothermal mass of catalyst is maintained substantially at a value corresponding to bubble-free fluidization by injection of a first aerating fluid.

10. A process as defined in claim 9, wherein the feed rate of the regenerated catalyst introduced into the heat exchanger is regulated by means of a valve located upstream of the catalyst.

11. A process as defined in claim 9, wherein the feed rate of the regenerated, catalyst introduced into the heat exchanger is regulated by injection of a second aerating fluid into the bent zone.

12. A process as defined in claim 11, wherein the flow rate of the second aerating fluid in the bent zone ranges from 0.01 to 0.05 kg/sec/m² of section in that zone.

13. A process as defined in claim 1, wherein $T_1$ ranges from 650° to 710° C., $T_2$ is about 910° C., $T_3$ ranges from 450° to 600° C., the quantity of catalyst withdrawn from the second regeneration zone and cooled is from 15 to 50 percent by weight of the mass of catalyst circulating through the first regeneration zone, and the $CO/CO_2$ ratio in the first combustion zone ranges from 0.3 to 1.3.

* * * * *